United States Patent

Lonsway

(10) Patent No.: US 10,058,025 B2
(45) Date of Patent: Aug. 28, 2018

(54) IN-LINE SOLUBLE MEDIA DELIVERY SYSTEM

(71) Applicant: Meterio Micheal Lonsway, Vail, AZ (US)

(72) Inventor: Meterio Micheal Lonsway, Vail, AZ (US)

(\*) Notice: Subject to any disclaimer, the term of this patent is extended or adjusted under 35 U.S.C. 154(b) by 290 days.

(21) Appl. No.: 14/985,856

(22) Filed: Dec. 31, 2015

(65) Prior Publication Data

US 2016/0198626 A1      Jul. 14, 2016

Related U.S. Application Data

(60) Provisional application No. 62/102,918, filed on Jan. 13, 2015.

(51) Int. Cl.
*A01G 29/00* (2006.01)
*A01C 23/04* (2006.01)
*B01F 1/00* (2006.01)

(52) U.S. Cl.
CPC .......... *A01C 23/042* (2013.01); *B01F 1/0016* (2013.01); *B01F 1/0027* (2013.01)

(58) Field of Classification Search
CPC .............................. A01C 23/042; B01F 1/0016
See application file for complete search history.

(56) References Cited

U.S. PATENT DOCUMENTS

| 4,477,960 | A  | * | 10/1984 | Knapp ................. A01C 23/042 264/261 |
| 5,769,318 | A  |   | 6/1998 | Greubel |
| 6,451,271 | B1 |   | 9/2002 | Hammonds |
| 6,648,243 | B1 |   | 11/2003 | Kastner |
| 7,674,313 | B2 | * | 3/2010 | Jordon ................. A01C 23/042 422/292 |
| 2006/0108376 | A1 | * | 5/2006 | Muir .................... A01C 23/042 222/129 |
| 2011/0000976 | A1 |   | 1/2011 | Roide |

FOREIGN PATENT DOCUMENTS

| CA | 2678537 | 3/2011 |
| JP | 201308559 | 5/2013 |
| WO | WO 2004062346 A1 * | 7/2004 ........... A01C 23/042 |
| WO | 2006034105 | 3/2006 |
| WO | 2008129310 | 10/2008 |

\* cited by examiner

*Primary Examiner* — Kristen C Hayes
(74) *Attorney, Agent, or Firm* — Grossman Tucker Perreault & Pfleger PLLC

(57) ABSTRACT

The present disclosure is directed to an in-line soluble media delivery system. In at least one embodiment, the system may comprise a housing including an inlet port and an outlet port. The inlet port may accept a liquid flow (e.g., water). A soluble media (e.g., fertilizer, herbicide, pesticide, etc.) in the delivery system may be exposed to the liquid flow, and may dissolve in the liquid over time. At least one filter may allow the liquid flow, now comprising at least some of the gradually dissolving media, to exit the system without allowing the bulk of the soluble media to exit. In at least one embodiment the system may comprise two filters with different porosity.

14 Claims, 9 Drawing Sheets

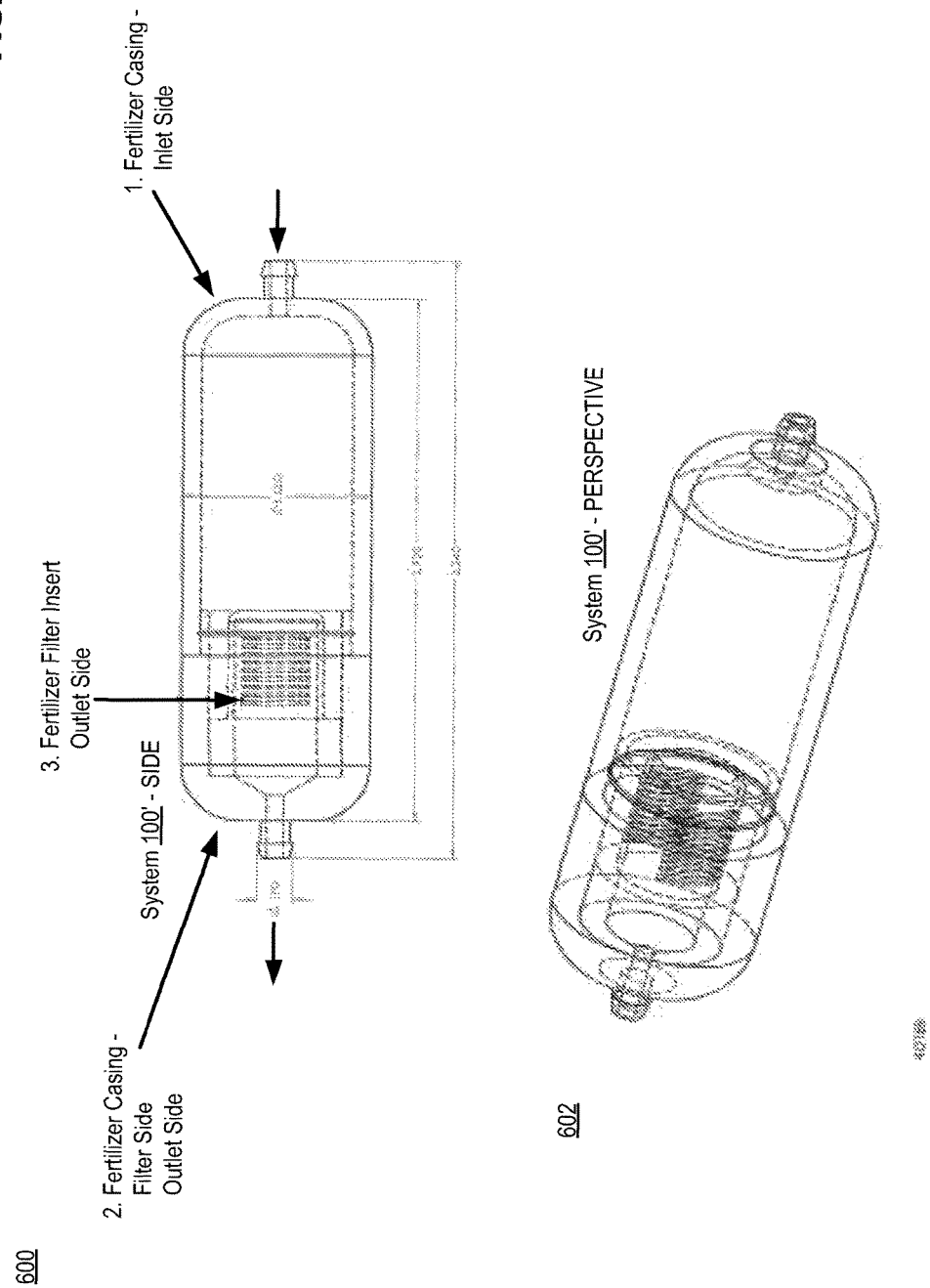

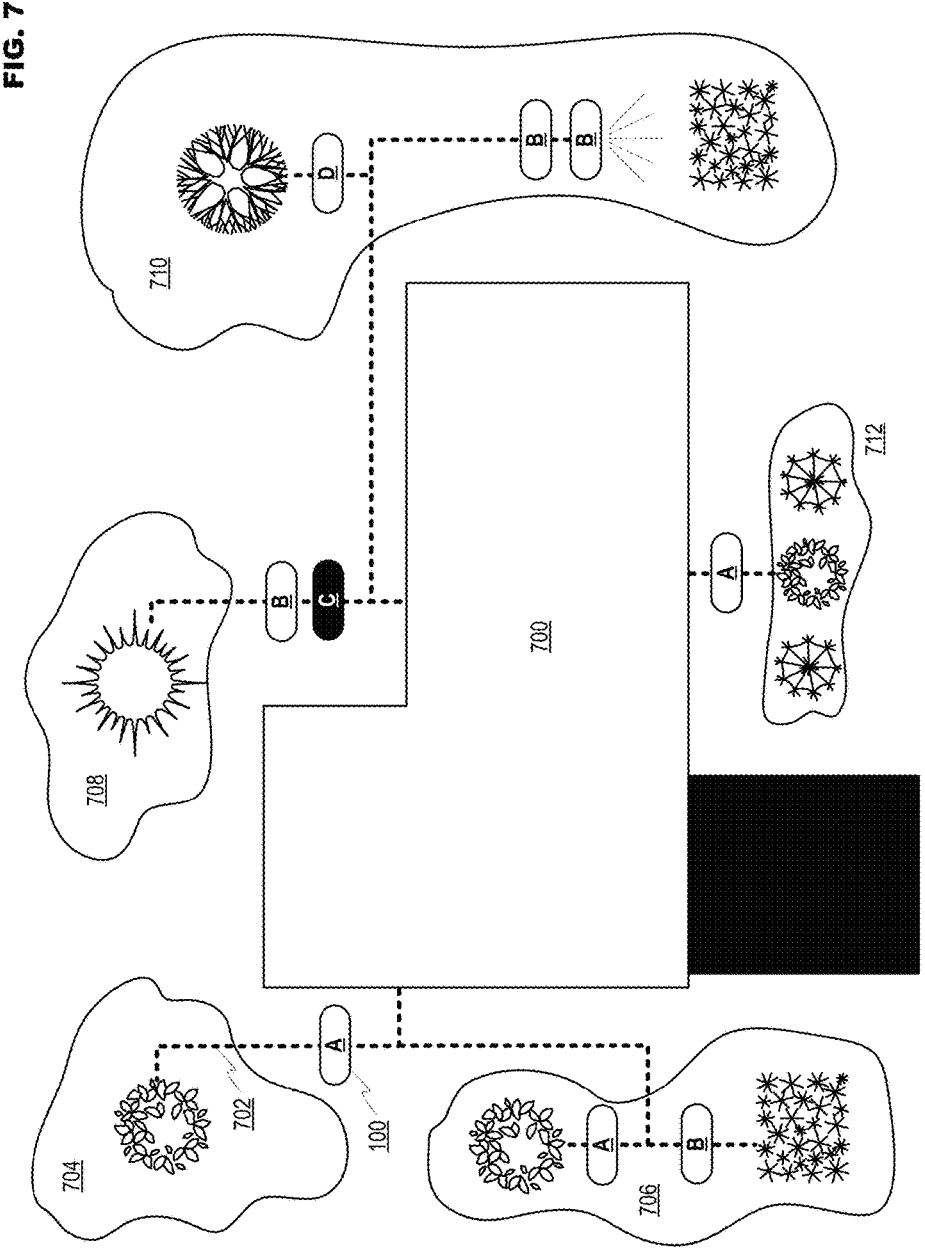

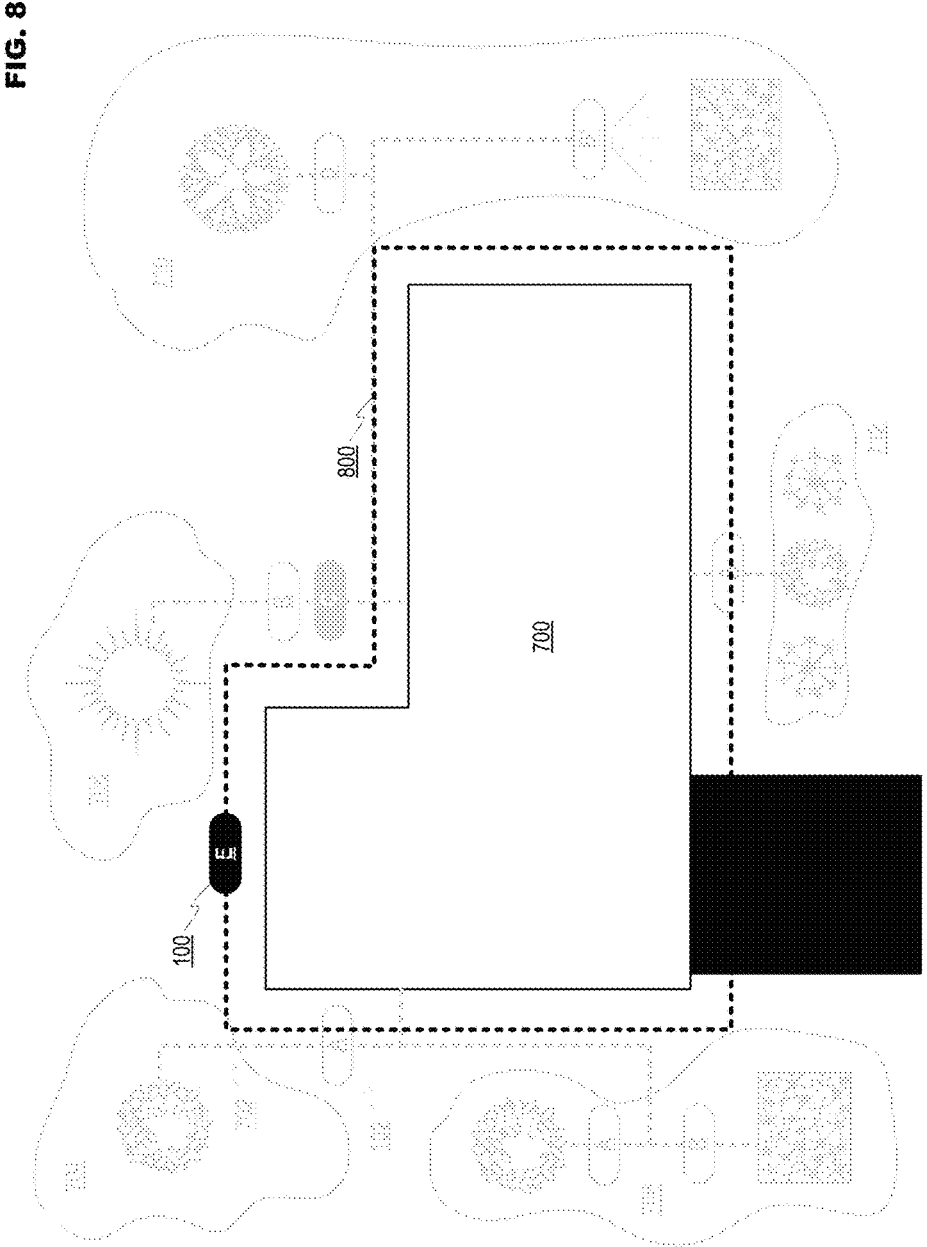

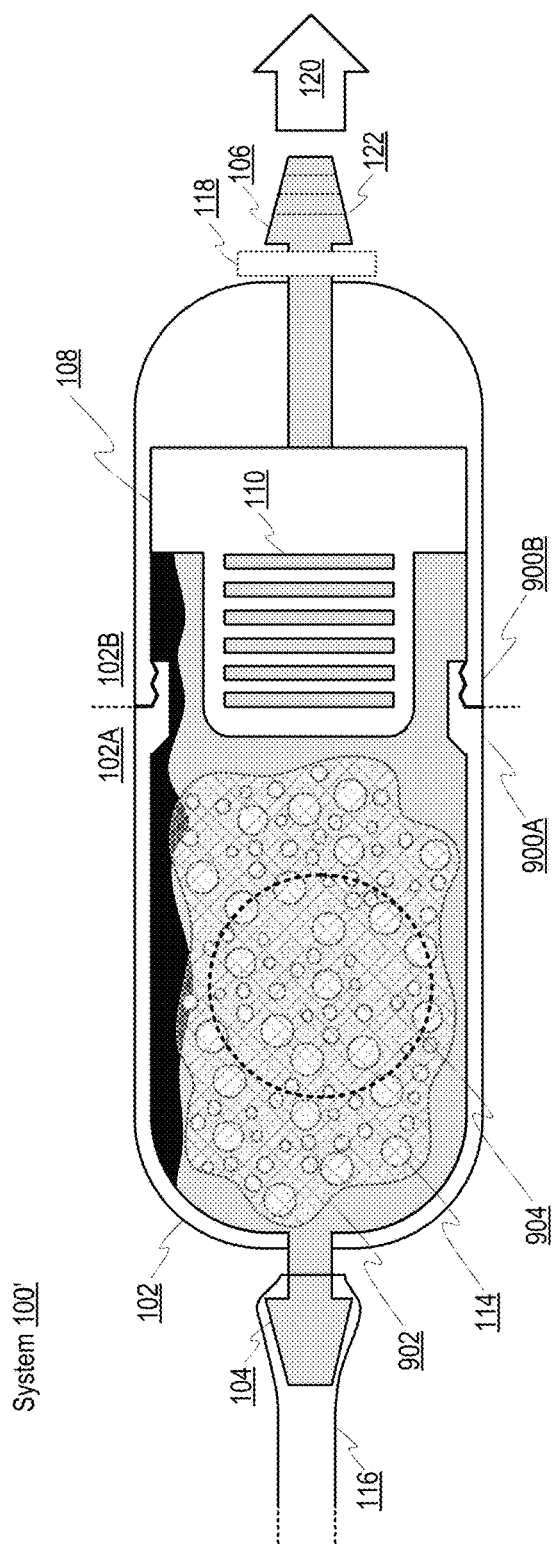

IN-LINE SOLUBLE MEDIA DELIVERY SYSTEM

PRIORITY

The present application claims the benefit of U.S. provisional application 62/102,918 entitled "In-line Soluble Media Delivery System" with a filing date of Jan. 13, 2015. The contents of the above-identified provisional application are incorporated by reference herein.

TECHNICAL FIELD

The present disclosure relates to delivery systems, and more particularly, to a delivery system for soluble media configured to operate in-line within a liquid transportation system.

BACKGROUND

Professional, agricultural or residential grounds maintenance is a substantial undertaking when considering time, materials, cost, etc. Installing new plants, crops, ground cover, etc. may be a lot of work, but this is only the first step. New plants will need water, food, etc. Plants and structures (e.g., homes, offices, etc.) will also require protection from various pests. An attempt to automate at least the water aspect of grounds maintenance may reduce the burden. However, a maintenance provider must also regularly apply fertilizer, herbicide pesticide, etc., especially in more arid regions where naturally-occurring nutrients may be scarce and the variety of attackers (e.g., indigenous plant life, ants, grasshoppers, beetles, termites, rodents, etc.) may be aggressive. Moreover, applying specialized fertilizer, herbicide, pesticide, etc. to a complex installation that may include various structures, different types of flora and fauna, etc. that each require different formulations based on their particular needs may prove to be too burdensome for a "part-time" maintenance provider. For example, this may require the mixing of different fertilizer, herbicide and/or pesticide formulations, the handling of hazardous materials, distributing the compositions to different areas of the installation, etc. All of these tasks must be repeated on a normal basis (e.g., based on the needs of the installation). Thus, the maintenance provider may not always be diligent in providing the specialized care needed, and the installation may not flourish as desired.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 6 illustrates an example of an assembled in-line soluble media delivery system in accordance with at least one embodiment of the present disclosure;

FIG. 7 illustrates an example implementation for the irrigation, feeding and/or protection of vegetation in accordance with at least one embodiment of the present disclosure;

FIG. 8 illustrates an example implementation for protecting a structure in accordance with at least one embodiment of the present disclosure; and FIG. 9 illustrates an example in-line soluble media delivery system that may be refilled with soluble media in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present disclosure is directed to an in-line soluble media delivery system. In at least one embodiment, the system may comprise a housing including an inlet port and an outlet port. The inlet port may accept a liquid flow (e.g., water). A soluble media (e.g., fertilizer, herbicide, pesticide, etc.) in the delivery system may be exposed to the liquid flow, and may dissolve in the liquid over time. At least one filter may allow the liquid flow, now comprising at least some of the gradually dissolving media, to exit the system without allowing the bulk of the soluble media to exit. In one embodiment the system may comprise two filters with different porosity to retain the bulk of the soluble media and also to keep smaller soluble media particles from blocking the liquid flow within the system or in a liquid conveyance system coupled to the outlet port of the system. For example, the system may be used in-line in a sprinkler or drip irrigation system, or may be part of a pest deterrence system (e.g., for protecting a structure such as a house or office).

Figure 1:
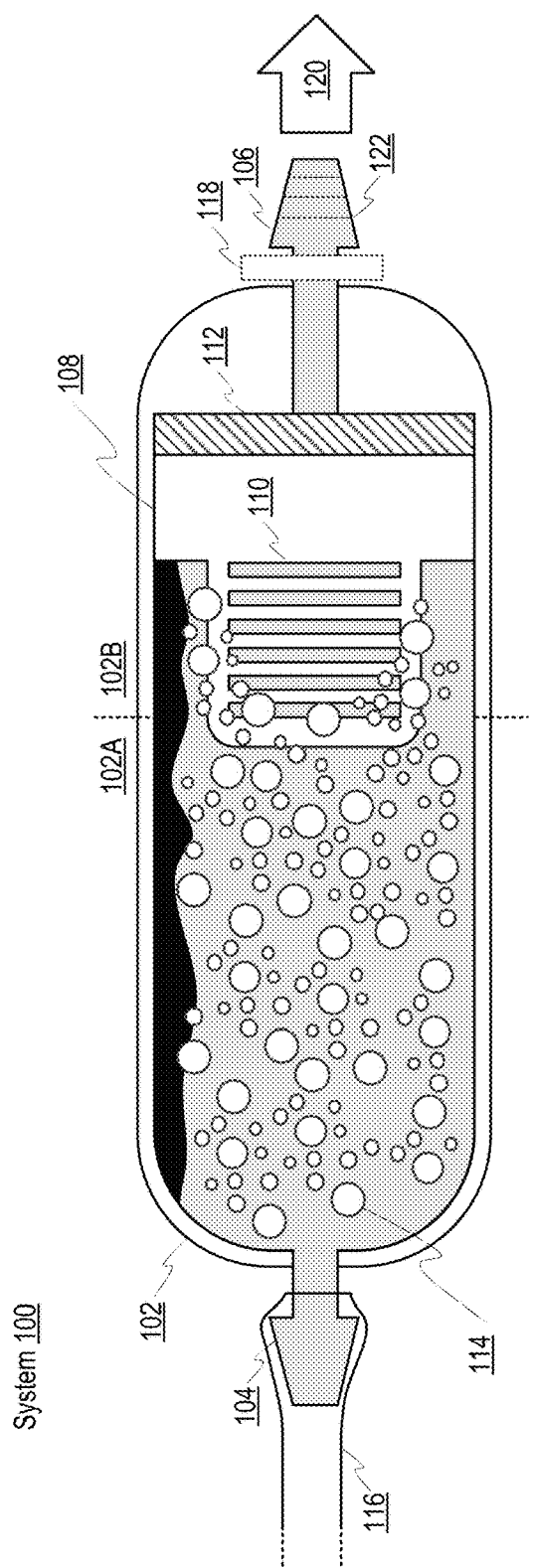
FIG. 1 illustrates an example in-line soluble media delivery system in accordance with at least one embodiment of the present disclosure.

FIG. 1 illustrates an example in-line soluble media delivery system in accordance with at least one embodiment of the present disclosure. System 100 may comprise, for example, at least outer housing 102, inlet port 104 and outlet port 106. In at least one embodiment, outer housing 102 may be made up of multiple pieces as represented by the dotted line in FIG. 1. For example, outer housing 102 may be made up of inlet portion 102A and outlet portion 102B. Inlet portion 102A may be coupled to outlet portion 102B via a snap connected including a male member and female receiver formed in portions 102A and 102B, via a glue connection, a screw connection or another similar method of connection. Inlet port 104 may be formed into inlet portion 102A and may be configured to couple to and/or retain liquid supply conduit 116. For example, while inlet port 104 in FIG. 1 is shown as having a shape over which liquid supply conduit 116 (e.g., a flexible hose or tube in an irrigation system) may slip and then be retained by friction created by the sharp edges of inlet port 104, other methods of connection and/or retention are also possible (e.g., screw connection, snap connection, retention through a force created by an external bracket or band, etc.). Outlet port 106 may have the same or a similar configuration to inlet portion 104.

Outer housing 102 may be configured to contain at least soluble media 114 and filter 108 (e.g., a "first" or "primary" filter within housing 102). Soluble media 114 may be any media, or combinations of media, soluble in a liquid (e.g., water) conveyed by liquid supply conduit 116. For example, soluble media 114 may include, but is not limited to, fertilizer, herbicide, pesticide or combinations thereof. Soluble media 114 may also be configured to dissolve gradually over time when exposed to the liquid. For example, soluble media 114 may include granules of different size, may include at least some granules coated with a material to vary the speed at which they dissolve, etc. Filter 108 may be configured to allow liquid including at least some of dissolved soluble media 114 to pass out to outlet port 106 while still retaining the undissolved portion of soluble media 114. For example, openings 110 may be formed in filter 108 to allow the liquid and dissolved material to flow out of housing 102. While openings 110 are shown in FIG. 1 to be elongated rectangular openings, other configurations of openings are possible such as circular holes, a lattice type strainer, a sieve-like structure, etc. In at least one example implementation, secondary filter 112 may be employed in combination with filter 108. Secondary filter 112 may be configured to retain smaller-sized pieces (e.g., remnants) of soluble media that may escape filter 108. Secondary filter 112 may comprise, for example, a fibrous but still porous material able to catch and retain small particles. In this manner, smaller remnants of soluble media 114 may be prevented from flowing out of system 100, as shown at 120, and into a liquid conveying conduit, bubbler, emitter, sprinkler, etc. that may be coupled to outlet port 106 (not shown). Without secondary filter 112 small particles may get into flow 120, which may eventually block or plug the liquid conveying conduit, emitter, bubbler, sprinkler, etc. In at least one embodiment, any or all of outer housing 102, filter 108 and/or secondary filter 112 may be made out of, for example, paper, glass, ceramics, wood, metal, metal alloys, plastic (e.g., new or recycled) or combinations thereof. These materials may be selected based on a variety of factors including, for example, safety, moldability, durability, environmental concerns, cost, etc.

In at least one embodiment, outer housing 102 may be transparent to, for example, allow a user of system 100 to determine the amount of soluble media 114 remaining. When no soluble media 114 remains in outer housing 102, a user may then replace system 100, may refill system 100 with new media (e.g., if inlet portion 102A is easily separable from outlet portion 102B for refilling), etc. In the same or a different embodiment, system 100 may comprise some indicia for aiding a user in utilizing system 100. For example, color-coding, pictures, symbols, etc. may be used to indicate the type of soluble media 114 in system 100, the direction intended for liquid to flow through outer housing 102 by identifying inlet port 104 and outlet port 106, etc. Given that outer housing 102 is transparent, filter 108 may be color coded to indicate a category of soluble media 114 (e.g., one or more of fertilizer, herbicide, pesticide, etc.), a type of each category (e.g., fertilizer for fruit trees, for succulents, for general purpose, a type of herbicide or pesticide, etc.). In another embodiment, inlet portion 102A may be transparent to show the amount of soluble media 114 remaining, while outlet portion 102B is opaque and color coded in a manner similar to described above in regard to filter 108. In the same or a different embodiment, outlet port 106 may comprise an assembly 118 to control the flow of liquid 120 from system 100. For example, assembly 118 may comprise a twist valve, gate value, butterfly valve, etc. that may be set by a user to control flow 120. Alternatively, outlet port 106 may comprise a plurality of removable sections 122. Sections 122 may be delineated by markings on outlet port 106, and may include scoring, perforations, etc. to facilitate easier removal. Removing each section 122 may increase the opening size in outlet port 106, and likewise flow 120. For example, each section 122 may correspond to an incremental increase in flow 120 (e.g., a one gallon/hour increase per section).

Figure 2:
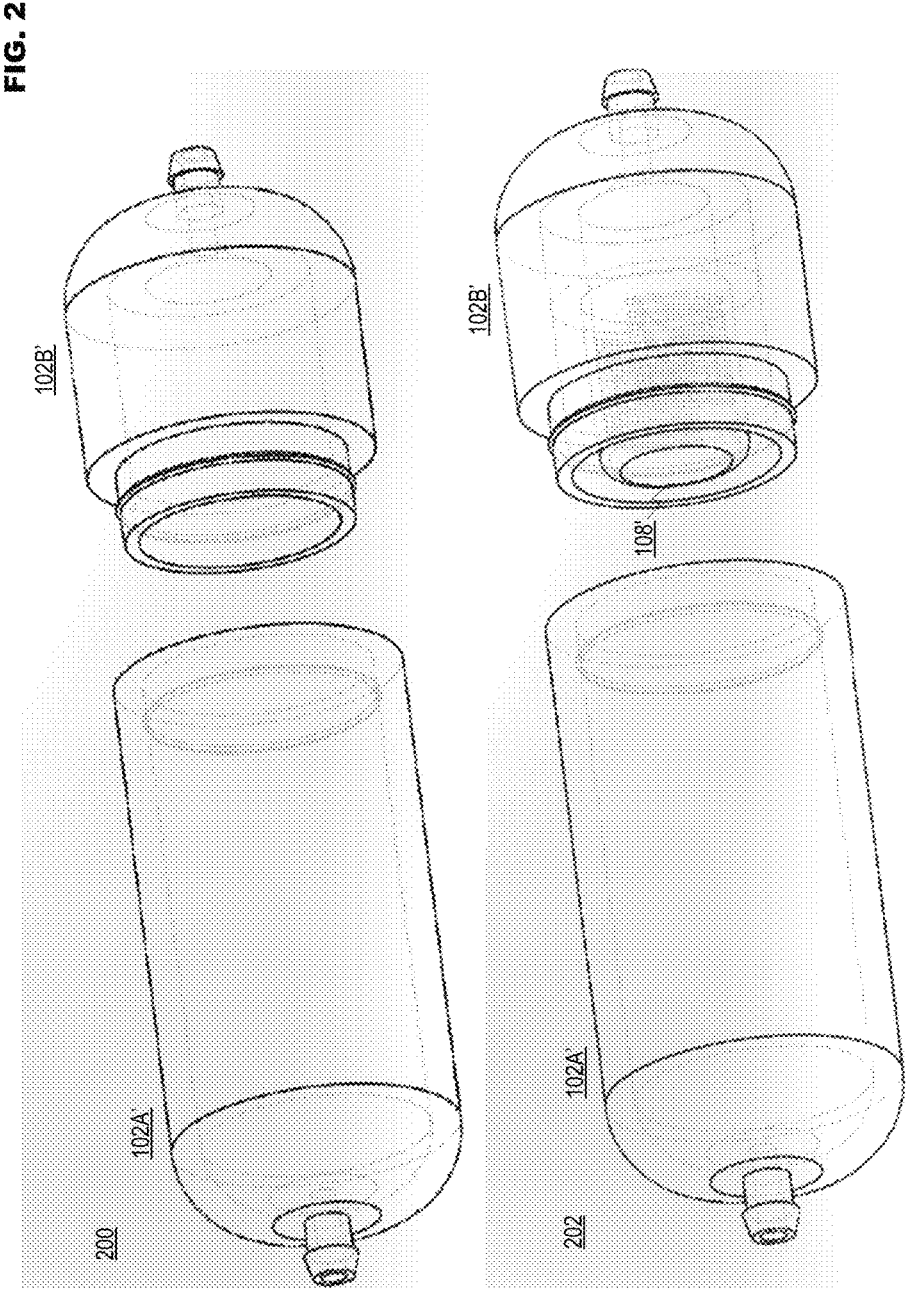
FIG. 2 illustrates an example outer housing with and without a filter in accordance with at least one embodiment of the present disclosure.

FIG. 2 illustrates an example outer housing with and without a filter in accordance with at least one embodiment of the present disclosure. Example 200 discloses a three-dimensional (3-D) representation of example inlet portion 102A' and example outlet portion 102B'. Example 202 discloses a similar 3-D representation as illustrated in example 200 but with the addition of example filter 108' placed within example outlet portion 102B'.

Figure 3:
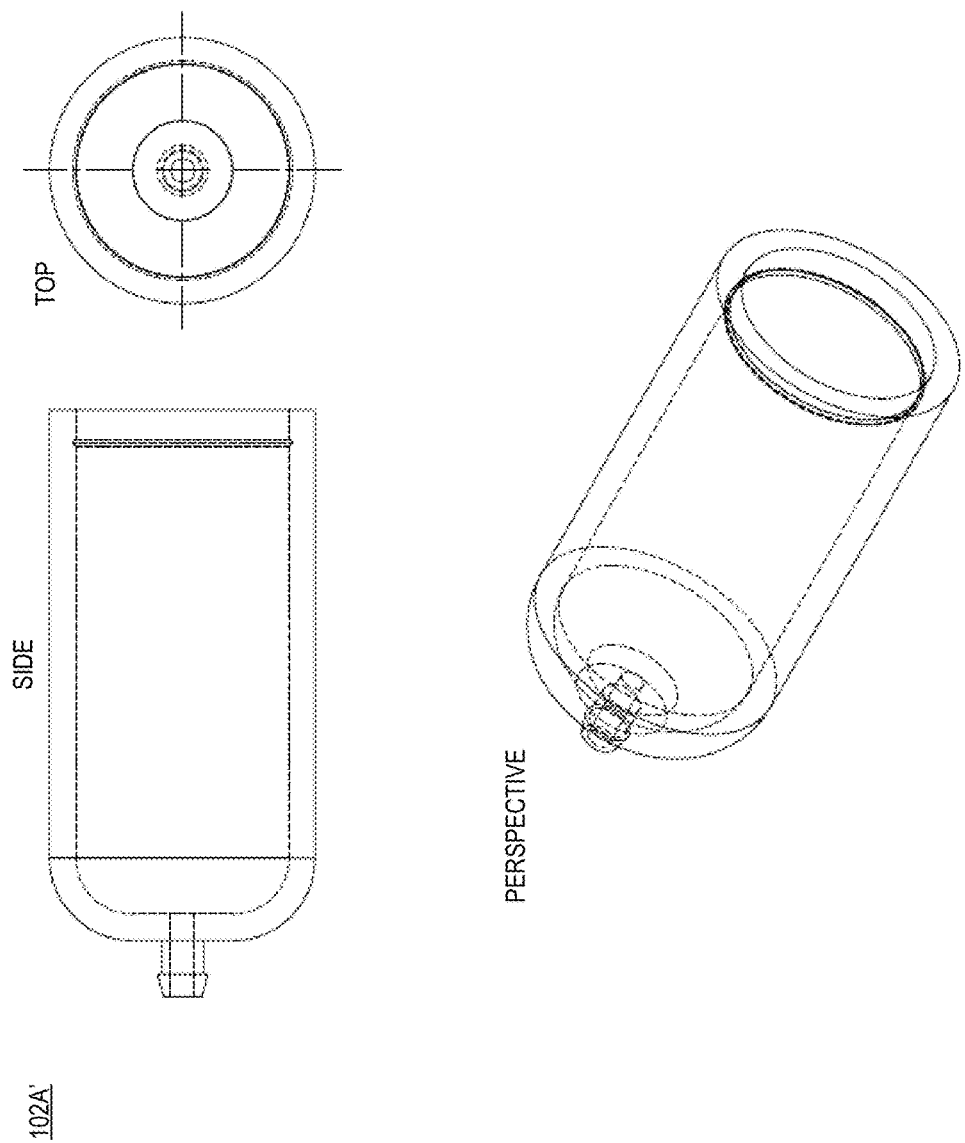
FIG. 3 illustrates an example inlet portion of the outer housing in accordance with at least one embodiment of the present disclosure.
Figure 4:
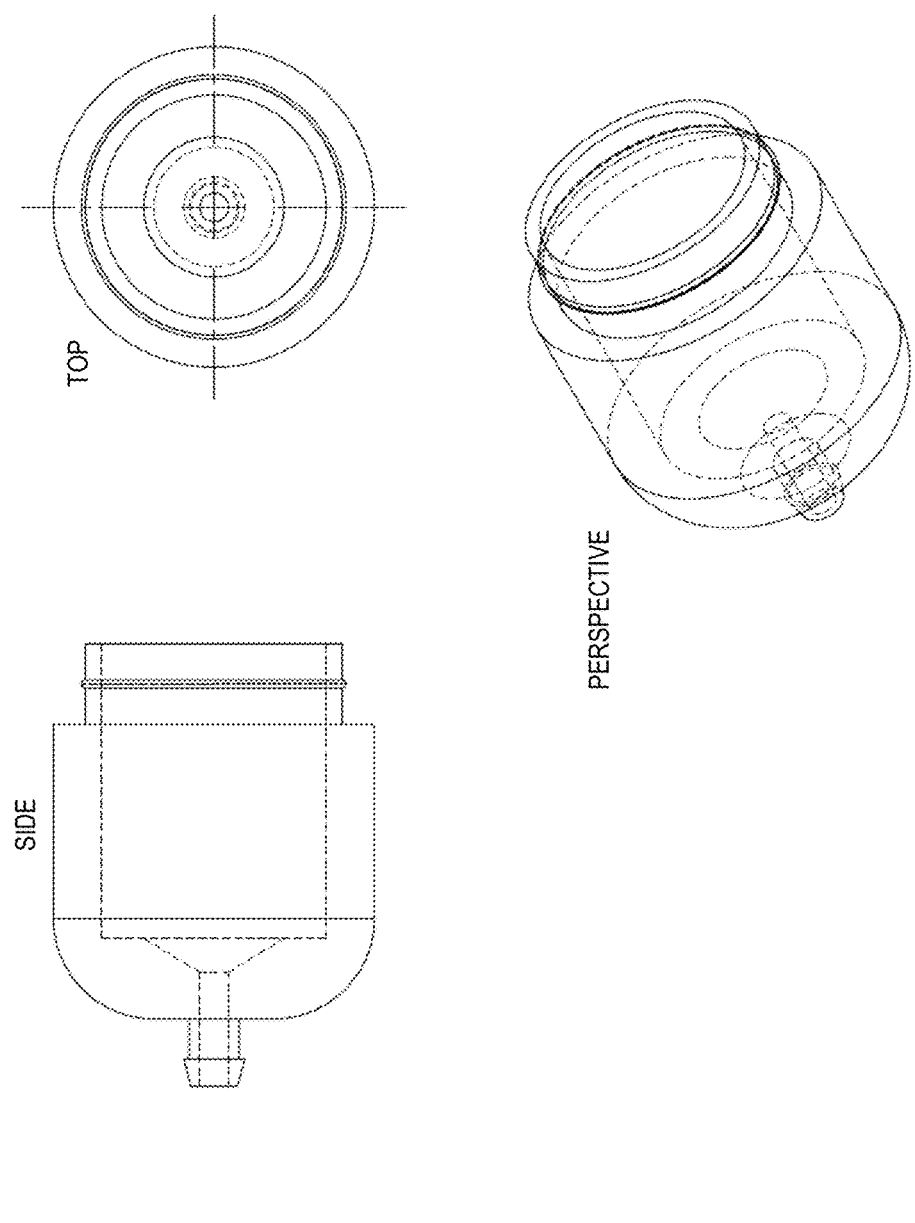
FIG. 4 illustrates an example outlet portion of the outer housing in accordance with at least one embodiment of the present disclosure.
Figure 5:
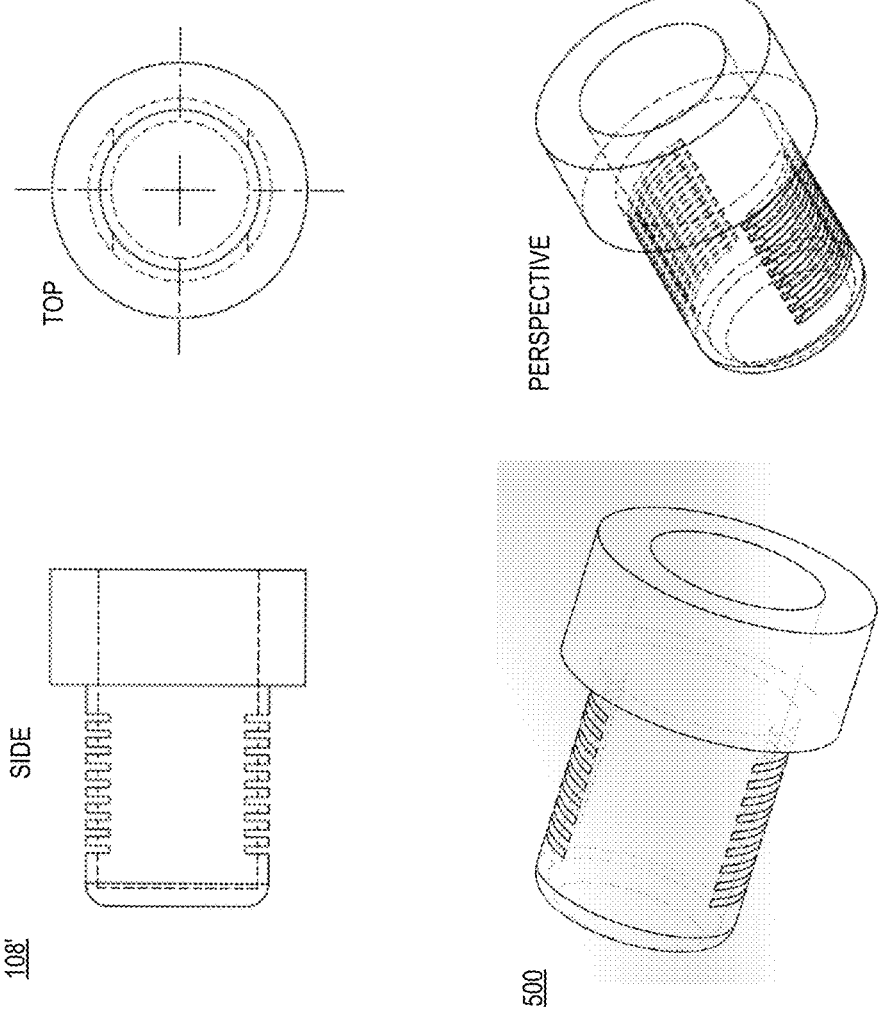
FIG. 5 illustrates an example filter in accordance with at least one embodiment of the present disclosure.

FIG. 3 illustrates an example inlet portion of the outer housing in accordance with at least one embodiment of the present disclosure. Side, top and perspective views of example inlet portion 102A' are disclosed in FIG. 3. FIG. 4 illustrates an example outlet portion of the outer housing in accordance with at least one embodiment of the present disclosure. Side, top and perspective views of example outlet portion 102B' are disclosed in FIG. 4. FIG. 5 illustrates an example filter in accordance with at least one embodiment of the present disclosure. In addition to 3-D representation 500, side, top and perspective views of example filter 108' are disclosed in FIG. 5. FIG. 6 illustrates an example of an assembled in-line soluble media delivery system in accordance with at least one embodiment of the present disclosure. A side view of example system 100' is shown at 600, while a perspective view of example system 100' is shown at 602.

FIG. 7 illustrates an example implementation for the irrigation, feeding and/or protection of vegetation in accordance with at least one embodiment of the present disclosure. The example of FIG. 7 relates to irrigation, feeding and protection of plant life in a domestic setting, however, embodiments consistent with the present disclosure may also be applicable to professional and/or agricultural settings. In the example implementation of FIG. 7, structure 700 (e.g., a house) may be equipped with irrigation system 702 and may be surrounded by a variety of planting areas or beds 704-712. Irrigation system 702 may comprise a plurality of irrigation lines that may each terminate in at least one emitter for delivering water to plants (e.g., sprinkler, drip, bubbler, etc.). The irrigation lines may be of the same diameter or may vary in diameter, with larger diameter irrigation lines supplying water to a network of smaller diameter irrigation lines that water the plants. One or more systems 100 may be coupled to different irrigation lines in irrigation system 702 to perform various functions. System 100 may site above ground or may be buried to, for example, prevent pets, children, wild animals, etc. from disturbing or disconnecting system 100. The insertion of system 100 into an irrigation line may simply involve severing the irrigation line and coupling the severed ends of the irrigation line to inlet port 104 and outlet port 106 in system 100. When installing system 100, a user may utilize indicia in/on system 100 to facilitate proper installation. The indicia may indicate, for example, the type of soluble media 114 in system 100, the expected usable life of system 100 based on flow rate, how water should flow through system 100, etc. In some instances, a user may also configure the flow rate of outlet port 106 based on, for example, the amount of water needed for the target plant, the type of emitter being used, etc.

For example, bed 704 may comprise the same type of plant corresponding to type "A" of system 100 (e.g., general fertilizer, succulents, fruit trees, etc.). As a result, a type "A" system 100 may be placed in-line to irrigate all of bed 704. Bed 706 incorporates at least two different types of plants. Thus, the irrigation line to bed 706 may be split to accommodate two different types of system 100 (e.g., "A" and "B"). This example demonstrates at least one advantage of embodiments consistent with the present disclosure in that each type of plant may be serviced over a long period of time simply by inserting the corresponding system 100 into the irrigation line watering each type of plant, and thus, the needs of particular plants may be met for weeks, months or even longer without a user having to separately attend to each variety of plant. Bed 708 may comprise plants needing both feeding and protection. In one embodiment, more than one system 100 may be inserted into the same irrigation line including, for example, a fertilizer type "B" system 100 and a herbicide and/or a pesticide type "C" system 100. In an alternative embodiment, both of these needs may be met by a single system 100 containing both fertilizer and herbicide/pesticide. Bed 710 may also comprise two different types of plants that may be supplied by different irrigation lines. A first variety of plant may be fertilized by a type "D" system 100. However, another variety of plants may require substantial amounts of fertilizer (e.g., new plantings, trees, etc.), and thus, be watered by a higher volume sprinkler-type emitter. The flow rate for watering these plants may be substantially higher than other varieties, and so two type "B" systems 100 may be used in series to ensure that the required amount of fertilizer is delivered to these plants. In at least one embodiment, outlet port 106 in both of the "B" systems 100 may be configured for the maximum flow rate to accommodate the needs of the particular situation. Bed 712 may comprise cacti along with plants that require fertilization utilizing a type "A" system 100. Another advantage that may be realized through embodiments consistent with the present disclosure is that targeted watering/fertilization may be performed without wasting resources (e.g., water/fertilizer) on other plants in the same area without the same requirements (e.g., the cacti), without harming these other plants by upsetting their natural soil conditions, etc.

FIG. 8 illustrates an example implementation for protecting a structure in accordance with at least one embodiment of the present disclosure. In an expanding variety of geographic locations, pests such as termites, rodents, etc. are becoming a constant nuisance. For example, treating for termites may involve a pest control company digging a ditch or trench around the structure (e.g., house 700) to be treated, applying a strong pesticide into the ditch, covering the ditch and repeating this process as needed. This process may need to be repeated on a regular basis in areas where termite infestation is commonplace, which may be a costly proposition.

Consistent with the present disclosure, a ditch or trench may be dug around a structure, and liquid distribution conduit 800 may be placed into the conduit. Conduit 800 may be able to distribute a liquid to the entire perimeter of house 700. For example, conduit 800 may be semi-permeable, may comprise perforations, holes, etc., may be periodically coupled to emitters that controllable release a liquid, etc. One or more type "E" systems 100 may be coupled to conduit 800, the type "E" system 100 comprising pesticide. In an example of operation, water may flow to the type "E" system 100 and then into conduit 800 to distribute pesticide to kill pests such as termites. The type "E" system 100 may then be replaced as needed without having to dig up conduit 800. In this manner, a user, maintenance provider, etc. may easily maintain pesticide levels in the soil immediately around the foundation of structure 700 without having to perform the steps commonly associated with termite treatment as it is known today.

In general, system 100, along with the corresponding examples and implementations that have been disclosed herein, have been presented herein merely for the sake of explaining various embodiments of the disclosure. The components of system 100 may vary (e.g., may be added, reconfigured, repositioned, omitted, etc.) consistent with the various embodiments of the present disclosure. The various example types of system 100, identified as "A" to "E" herein, have been presented simply to indicate that system 100 may be configured in a variety of manners, and are not intended to limit the variety of system 100 to any particular number or type of configuration.

Example Refillable in-Line Soluble Media Delivery System

FIG. 9 illustrates an example in-line soluble media delivery system that may be refilled with soluble media in accordance with at least one embodiment of the present disclosure. Item numbers in example system 100' that correspond to the item numbers in example system 100 as shown in FIG. 1 have been repeated for reference, but not explained again for the sake of brevity. System 100' in FIG. 9 may be "refillable" in that, for example, housing portions 102A and 102B may be separable without having to detach system 100' from liquid supply conduit 116 or any other conduit to which outlet port 106 may be connected. The ability to refill system 100' may be more economical and less wasteful than replacing the entirety of system 100' in that most of system 100' may be substantially reused reducing waste and replacement costs, the useful life of conduits to which system 100' may be extended by avoiding undue stress being placed on liquid supply conduit 116 and any conduit to which outlet portion 106 is connected, etc.

In at least one embodiment, housing portions 102A and 102B may be coupled utilizing a separable connection made up of fittings 900A and 900B in FIG. 9. Housing portion 102B may comprise a fitting 900B that fits over fitting 900A in housing portion 102A. When coupled, the joint formed by coupling fitting 900A to fitting 900B may be substantially watertight. Fittings 900A and 900B may also be reversed so that portion 102B fits within portion 102A. Examples of various fitting types include, but are not limited to, pressure slip-on or snap-on fittings, screw twist-on fittings, etc. In at least one example implementation, fittings 900A and 900B on one side of housing 102 may be replaced with a hinge-type coupling so that housing portions 102A and 102B may be "opened" for refilling. It may further be beneficial to have at least one fitting 900A lock to fitting 900B (e.g., or at least make one set of fittings 900A and 900B childproof or harder to open) to make it more difficult for children, animals, etc. to access soluble media 114.

In at least one embodiment, soluble media 114 may be held in filter pouch 902. Filter pouch 902 may be a liquid-permeable bag in which soluble media 114 is held for exposure to liquid (e.g., water) flowing through system 100'. Filter pouch 902 may be made up of one or more materials, with at least one material that is permeable by the liquid to allow soluble media 114 to dissolve. For example, the at least one material may be a netting, mesh, stocking-type or other similar material that may both hold particles of undissolved soluble material 114 while still allowing the liquid and dissolved soluble media 114 to pass. This filtering action may remove the necessity of including secondary filter 112 (e.g., as illustrated in FIG. 1) in that at least some of the material making of filter pouch 902 may serve the same purpose. As a result, secondary filter 112 has been omitted from system 100' illustrated in FIG. 9, which in some instances may reduce the complexity, cost, etc. The inclusion of filter pouch 902 may also serve various other purposes. Filter pouch 902 may facilitate easy refilling of system 100' in that a predetermined amount of soluble media 114 (e.g., to last a certain amount of time, for a certain expected liquid flow, etc.) may be inserted into system 100' without having to measure soluble media 114. In at least one example implementation filter pouch 902 may comprise indicia to indicate at least one characteristic of soluble media 114. For example, at least some of the material making up filter pouch 902 may be of a certain color to indicate that, for example, soluble media 114 is fertilizer, herbicide and/or pesticide, a type of the fertilizer, herbicide and/or pesticide, a particular use for which soluble media 114 is intended, etc. The indicia of filter pouch 902 may further correspond to the color coding of filter 108 as previously described herein. For example, a user may be able to match a color of filter pouch 902 to a color of filter 108 when attempting to refill system 100' to make sure that filter pouch 902 comprises the correct type of soluble media 114. Moreover, at least a portion of housing 102 may be substantially transparent as illustrated at 904. Transparent portion 904 may allow at least filter pouch 902 and/or soluble media 114 to be visible external to housing 102. Alternatively, all of housing portion 102A, or of housing 102, may be substantially transparent. In an example of operation, a user may look at filter pouch 902 to determine the type of soluble media 114 in system 100', may check to see if any soluble media 114 remains visible in system 100', and thus, whether replacement of filter pouch 902 is necessary, etc. The user may then simply open housing 102 (e.g., via couplings 900A and 900B), remove the empty filter pouch 902 and replace it with a filter pouch 902 comprising the same soluble media 114 as the previous filter pouch 902 based on, for example, matching the indicia (e.g. color) of the filter pouches 902, matching the indicia of the new filter pouch 902 to the indicia of filter 108, etc.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

Thus, the present disclosure is directed to an in-line soluble media delivery system. In at least one embodiment, the system may comprise a housing including an inlet port and an outlet port. The inlet port may accept a liquid flow (e.g., water). A soluble media (e.g., fertilizer, herbicide, pesticide, etc.) in the delivery system may be exposed to the liquid flow, and may dissolve in the liquid over time. At least one filter may allow the liquid flow, now comprising at least some of the gradually dissolving media, to exit the system without allowing the bulk of the soluble media to exit. In at least one embodiment the system may comprise two filters with different porosity.

The following examples pertain to further embodiments. The following examples of the present disclosure may comprise subject material such as a device, components, methodologies and applications pertaining to an in-line soluble media delivery system, as provided below.

According to example 1 there is provided an in-line soluble media delivery system. The system may comprise a soluble media to be delivered by a liquid by gradually dissolving into the liquid, a housing to at least expose the soluble media to the liquid, the housing including at least an inlet port to receive the liquid and an outlet port to output the liquid and dissolved soluble media, a first filter within the housing, the first filter configured to filter a first particle size of the soluble media and a second filter within the housing, the second filter configured to filter a second particle size of the soluble media smaller than the first particle size of the soluble media.

Example 2 may include the elements of example 1, wherein the soluble media comprises at least one of fertilizer, herbicide or pesticide.

Example 3 may include the elements of example 1, wherein the outlet port comprises at least a flow control assembly.

Example 4 may include the elements of example 1, wherein the outlet port comprises at least removable portions that, when removed, alter an opening size in the outlet port.

Example 5 may include the elements of example 1, wherein the housing is transparent.

Example 6 may include the elements of example 1, wherein the first filter is color-coded based on the soluble media.

Example 7 may include the elements of example 1, wherein the housing is refillable with additional soluble media.

Example 8 may include the elements of example 1, wherein the housing comprises at least two portions, at least one of the at least two portions being color-coded based on the soluble media.

Example 9 may include the elements of example 1, wherein the system is coupled to an irrigation system to provide the dissolved soluble media to plants.

Example 10 may include the elements of example 1, wherein the system is coupled to a pest control system to provide the dissolved soluble media to prevent infestation.

According to example 11 there is provided an in-line soluble media delivery system. The system may comprise a filter pouch to hold a soluble media for gradual dissolution into a liquid, the filter pouch including at least indicia to indicate at least one characteristic of the soluble media, a housing to at least expose the soluble media to the liquid, the housing including at least an inlet port to receive the liquid and an outlet port to output the liquid and dissolved soluble media, wherein at least part of the housing is substantially transparent to allow the indicia of the filter pouch to be viewable external to the housing and a first filter within the housing.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:
1. An in-line soluble media delivery system, comprising:
 a soluble media to be delivered by a liquid by gradually dissolving into the liquid;
 a housing to at least expose the soluble media to the liquid, wherein the housing is at least partially transparent and includes at least an inlet port to receive the liquid and an outlet port to output the liquid and dissolved soluble media;

a first filter within the housing, wherein the first filter is configured to filter a first particle size of the soluble media and color-coded to indicate a category or type for the soluble media; and a second filter within the housing, the second filter configured to filter a second particle size of the soluble media smaller than the first particle size of the soluble media.

2. The system of claim 1, wherein the soluble media comprises at least one of fertilizer, herbicide or pesticide.

3. The system of claim 1, wherein the outlet port comprises at least a flow control assembly.

4. The system of claim 1, wherein the outlet port comprises at least removable portions that, when removed, alter an opening size in the outlet port.

5. The system of claim 1, wherein the system is coupled to an irrigation system to provide the dissolved soluble media to plants.

6. The system of claim 1, wherein the system is coupled to a pest control system to provide the dissolved soluble media to prevent infestation.

7. An in-line soluble media delivery system, comprising:

a soluble media to be delivered by a liquid by gradually dissolving into the liquid;

a housing to at least expose the soluble media to the liquid, the housing including at least an inlet port to receive the liquid, an outlet port to output the liquid and dissolved soluble media and at least two portions, at least one of the at least two portions being color-coded based on the soluble media;

a first filter within the housing, the first filter configured to filter a first particle size of the soluble media; and a second filter within the housing, the second filter configured to filter a second particle size of the soluble media smaller than the first particle size of the soluble media.

8. An in-line soluble media delivery system, comprising:

a filter pouch to hold a soluble media for gradual dissolution into a liquid, the filter pouch including at least indicia to indicate at least one characteristic of the soluble media;

a housing to at least expose the soluble media to the liquid, the housing including at least an inlet port to receive the liquid and an outlet port to output the liquid and dissolved soluble media, wherein at least part of the housing is substantially transparent to allow the indicia of the filter pouch to be viewable external to the housing;

a first filter within the housing, wherein the first filter is to filter a first particle size of the soluble media and prevent the filter pouch or the soluble media from blocking the outlet port; and a second filter configured to filter a second particle size of the soluble media smaller than the first particle size of the soluble media, wherein the second filter is a material making up at least a portion of the filter pouch.

9. The system of claim 8, wherein the soluble media comprises at least one of fertilizer, herbicide or pesticide.

10. The system of claim 8, wherein the indicia in the filter pouch includes at least a color to indicate the at least one characteristic of the soluble media.

11. The system of claim 10, wherein the first filter comprises a color matching the color of the filter pouch to indicate the at least one characteristic of the soluble media.

12. The system of claim 8, wherein the housing comprises at least two separable portions that, when separated, allow replacement of at least the filter pouch.

13. The system of claim 8, wherein the system is coupled to an irrigation system to provide the dissolved soluble media to plants.

14. The system of claim 8, wherein the system is coupled to a pest control system to provide the dissolved soluble media to at least the foundation of a structure to prevent infestation of the structure by at least one of insects or animals.

* * * * *